United States Patent [19]
Chen et al.

[11] Patent Number: 6,023,511
[45] Date of Patent: Feb. 8, 2000

[54] CRYPTOSYSTEM FOR ENCRYPTING DIGITAL IMAGE OR VOICE FILE

[75] Inventors: Tung-Shou Chen; Chin-Chen Chang; Min-Shiang Hwang, all of Taichung, Taiwan

[73] Assignee: INFOSEC Information Security Co., Ltd., Taipei, Taiwan

[21] Appl. No.: 09/013,402

[22] Filed: Jan. 27, 1998

[51] Int. Cl.[7] .............................. H04L 9/00; H04L 9/28; G09C 1/00
[52] U.S. Cl. ................................ 380/54; 380/28; 380/51; 380/55
[58] Field of Search ................................. 380/54, 55, 28, 380/6; 382/165, 232

[56] References Cited

U.S. PATENT DOCUMENTS

| | | | |
|---|---|---|---|
| 4,949,381 | 8/1990 | Pastor | 380/51 |
| 5,031,215 | 7/1991 | Pastor | 380/51 |
| 5,485,526 | 1/1996 | Tobin | 382/232 |
| 5,583,941 | 12/1996 | Yoshida et al. | 380/51 |

*Primary Examiner*—Tod R. Swann
*Assistant Examiner*—Steve Kabakoff
*Attorney, Agent, or Firm*—Winston Hsu

[57] ABSTRACT

The present invention provides a cryptosystem for encrypting an original image or voice file by using a camouflaging image or voice file. Each of the original and camouflaging files comprises a plurality of basic units arranged according to a predetermined sequence. The cryptosystem comprises a memory for storing the original and camouflaging files and programs, a processor for executing the programs stored in the memory, and an encrypting program stored in the memory for encrypting the original file by using the camouflaging file. The encrypting program will divide all the basic units of each of the original and camouflaging files into a plurality of equal-sized data blocks, assign an index number to each data block of the camouflaging file, compare each data block of the original file with the data blocks of the camouflaging file according to a predetermined comparing method to find a most similar data block, record the index number of the most similar data block for each data block of the original file in the memory, and merge all the recorded index numbers of the original file with lower order bits of the basic units of the camouflaging file according to a predetermined merging method to generate an encrypted file for the original file.

11 Claims, 9 Drawing Sheets

CRYPTOSYSTEM FOR ENCRYPTING DIGITAL IMAGE OR VOICE FILE

BACKGROUND OF THE INVENTION

1. Field of the Invention

The present invention relates to a cryptosystem, and more particularly, to a cryptosystem for encrypting digital image or voice files.

2. Description of the Prior Art

Internet has become the most important data communication channel in modern society. Many data files such as text files, image files and voice files are usually transmitted between users as electronic mails through Internet. Since each electronic mail has to pass through several Internet servers before it can be received by a target user, security of the electronic mail in the transmission process becomes an important issue. Since there is no way to guarantee that an E-mail can be safely transmitted without being copied by other people, data encryption is usually used before transmitting a data file.

A traditional cryptosystem usually encrypts the original image or voice file by rearranging the data contained in the original file. Such encrypted file usually attracts an illegal intruder's attention and make it a target of the intruder.

SUMMARY OF THE INVENTION

It is therefore a primary objective of the present invention to provide a cryptosystem which uses a camouflaging file to encrypt and hide an original image or voice file to solve the above mentioned problem of the traditional cryptosystem.

In a preferred embodiment, the present invention provides a cryptosystem for encrypting an original image or voice file by using a camouflaging image or voice file, each of the original and camouflaging files comprising a plurality of basic units arranged according to a predetermined sequence, each basic unit comprising a predetermined number of digital bits arranged from high order to low order, the cryptosystem comprising:

- a memory for storing the original and camouflaging files and programs;
- a processor for executing the programs stored in the memory; and
- an encrypting program stored in the memory for encrypting the original file by using the camouflaging file;

wherein the encrypting program will divide all the basic units of each of the original and camouflaging files into a plurality of equal-sized data blocks, assign an index number to each data block of the camouflaging file, compare each data block of the original file with the data blocks of the camouflaging file according to a predetermined comparing method to find a most similar data block, record the index number of the most similar data block for each data block of the original file in the memory, and merge all the recorded index numbers of the original file with lower order bits of the basic units of the camouflaging file according to a predetermined merging method to generate an encrypted file for the original file.

It is an advantage of the present invention that the cryptosystem can convert the original file into a plurality of index numbers and then hide the index numbers into the lower order bits of the camouflaging file so that it is difficult for an intruder to suspect that an original image or voice file is hidden in the encrypted file.

These and other objectives of the present invention will no doubt become obvious to those of ordinary skill in the art after reading the following detailed description of the preferred embodiment which is illustrated in the various figures and drawings.

BRIEF DESCRIPTION OF THE DRAWINGS

FIG. 4 to FIG. 7 show four methods of storing index numbers of an original image file into a camouflaging image file.

DETAILED DESCRIPTION OF THE PREFERRED EMBODIMENT

Figure 1:
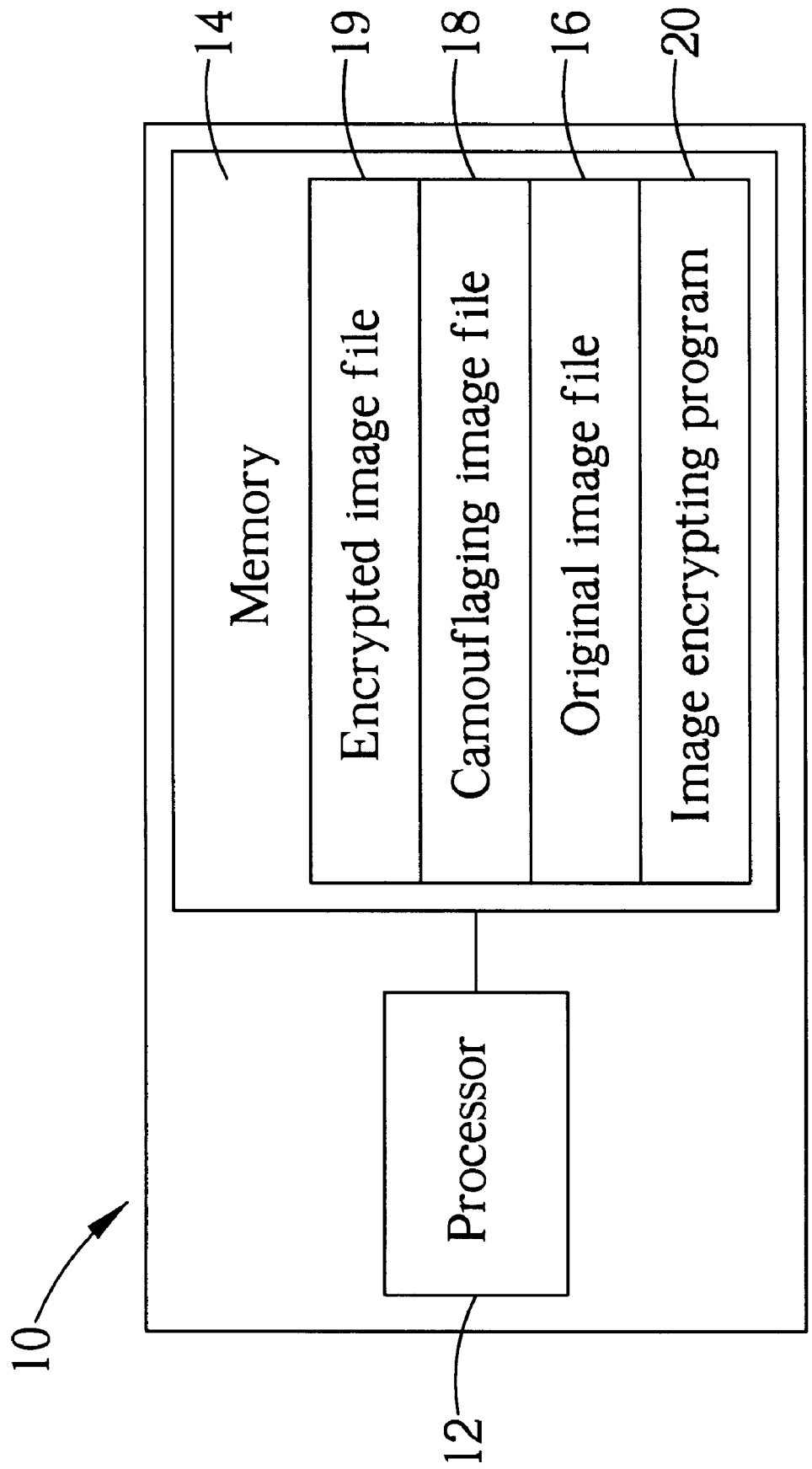
FIG. 1 is a function block diagram of an image cryptosystem according to the present invention.

Please refer to FIG. 1. FIG. 1 is a function block diagram of an image cryptosystem 10 according to the present invention. The cryptosystem 10 comprises a memory 14 for storing data and programs, and a processor 12 for executing the programs stored in the memory 14. The memory 14 comprises an original image file 16, a camouflaging image file 18, an encrypted image file 19, and an image encrypting program 20 stored in it.

Figure 3:
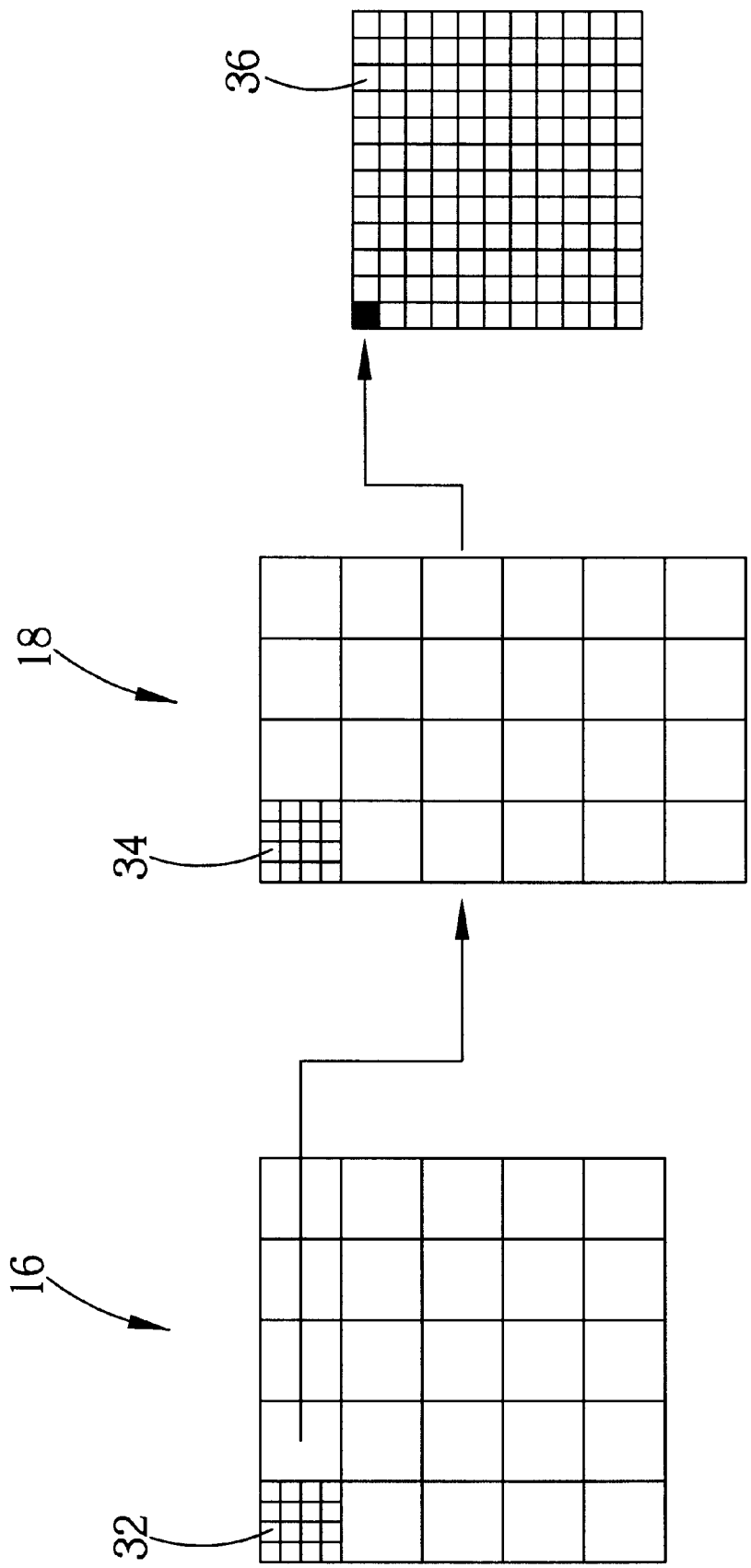
FIG. 3 is a diagrammatic view of a vector encoding procedure used by the image cryptosystem according to the present invention.

The image encrypting program 20 will first converts the original image file 16 into a plurality of index numbers by using the camouflaging image file 18 according to the vector encoding procedure shown in FIG. 3, and then merge the index numbers into the lower bits of each pixel of the camouflaging image file 18 according to one of four merging methods shown in FIGS. 4 to 7 to generate the encrypted image file 19.

Figure 2:
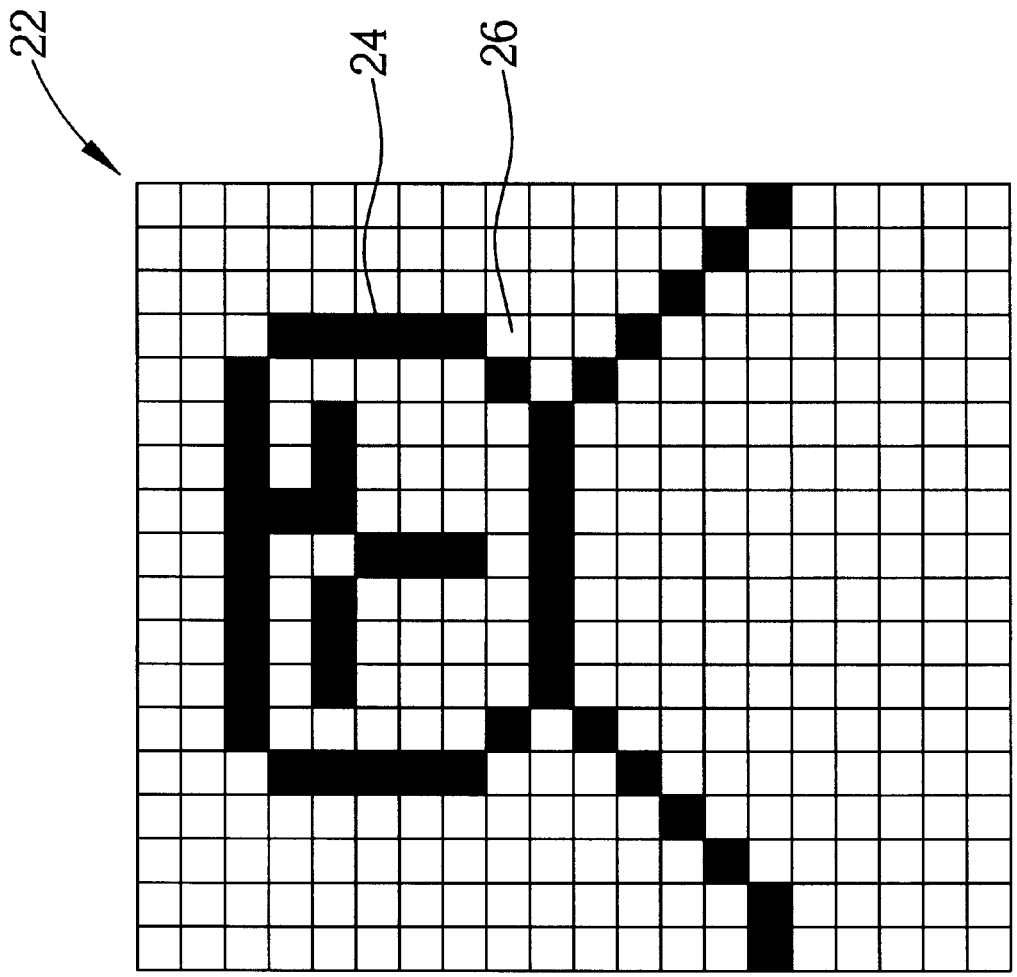
FIG. 2 is an image contained in an image file.

Please refer to FIG. 2. FIG. 2 shows an image contained in an image file 22 for illustrating the data structure of an image file such as the original image file 16 or the camouflaging image file 18. The image comprises a plurality of pixels (picture elements) arranged in a matrix format. All the pixels are stored in the image file 22 in a line by line sequence. Each pixel can be represented as a byte indicating the gray level of the pixel, or it can be represented as three bytes indicating three basic colors (R,G,B) of the pixel. For example, the pixels 24 and 26 may be coded as 11010100 and 00010010. The number of bits contained in one pixel represents the resolution of each pixel. For example, a pixel with eight bits may have 256 gray level variations. The left most bit of each pixel is the highest order bit and the right most bit is the lowest order bit. A high order bit has more influence than a low order bit over the gray level of each pixel. Variations over the lower order bits usually have very minor impact over the look of the image contained in an image file and usually can not be detected by human eyes. If some data bits to be transmitted through the Internet is stored in the lower order bits of the image file 22 in a predetermined manner, it is very difficult for a person to identify the variations over the lower order bits of the image file 22 by eyes. This is the reason why the camouflaging image file 18 is called a camouflaging file because it is used to hide the index numbers converted from the original image file 16 in its lower order bits.

Please refer to FIG. 3. FIG. 3 is a diagrammatic view of a vector encoding procedure performed by the image encrypting program 20 of the image cryptosystem 10. The vector encoding procedure will convert the original image file 16 into a plurality of index numbers by using the camouflaging image file 18 and record the index numbers in a conversion file 36 sequentially. The vector encoding procedure comprises the following steps:

(1) dividing the original image file 16 into a plurality of equal-sized image squares 32 each may contains, for example, four pixels on each side, and assigning a serial number to each image square 32 in a predetermined order such as from left to right in each line and from top line to bottom line;

(2) dividing the camouflaging image file 18 into a plurality of equal-sized image squares 34 in the same manner as step (1), and assigning an index number to each image square 34 in a predetermined order such as from left to right in each line and from top line to bottom line;

(3) selecting an image square 32 according to its serial number;

(4) comparing the selected image square 32 with every image square 34 of the camouflaging image file 18 to find a most similar image square 34 according to a predetermined comparing method, and storing the index number of the most similar image square 34 in the conversion file 36; and (5) repeating steps (3) and (4) until all image squares 32 of the original image file 16 are converted into index numbers.

Many comparing methods can be used in step (4). One comparing method is to treat each of the image squares 32 and 34 as a vector. Each vector comprises 16 bytes which is equal to 128 sequentially arranged bits. The distance between two vectors is defined as the number of different bits between these two vectors. In other words, logic XOR (exclusive OR) will be operated on these two vectors first, and the result of the logic XOR will be added up to obtain the distance between the two vectors. The distance between the image squares 32 and 34 represents a similarity measurement between the two image squares. A small distance between two image squares 32 and 34 means these two image squares are very similar.

In step (4), each image square 32 of the original image file 16 will be compared with all the image squares 34 of the camouflaging image file 18 to find a most similar image square 34 which has the smallest distance with the image square 32. The index number of the most similar image square 34 will be recorded in the conversion file 36. Because the bit number of each index number is much smaller than the bit number of each image square 32, the conversion file 36 will take much less memory space than the original image file 16.

Figure 9:
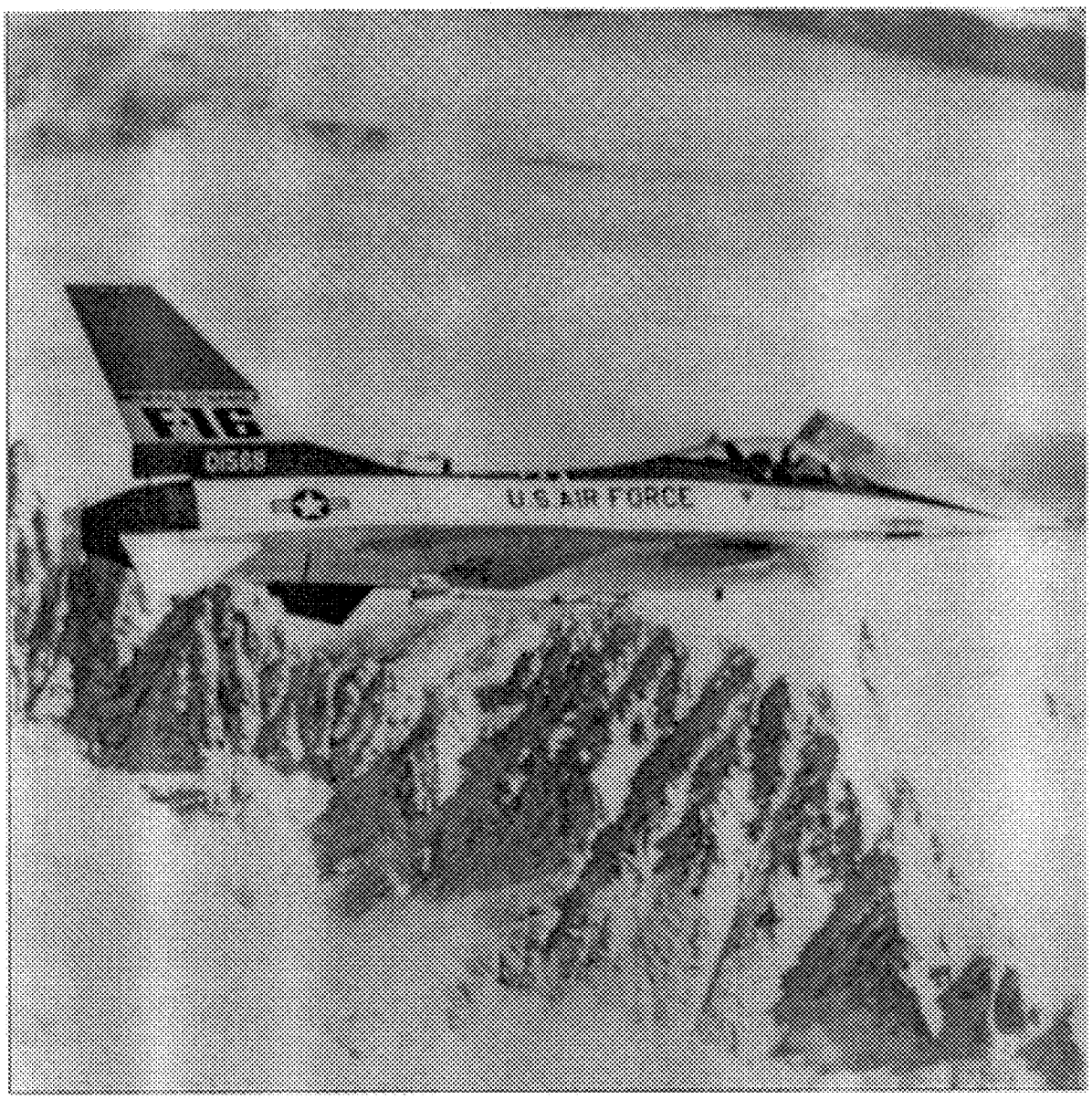
FIGS. 9–12 show various images used or generated by the image cryptosystem in each stage according to the present invention.
Figure 12:
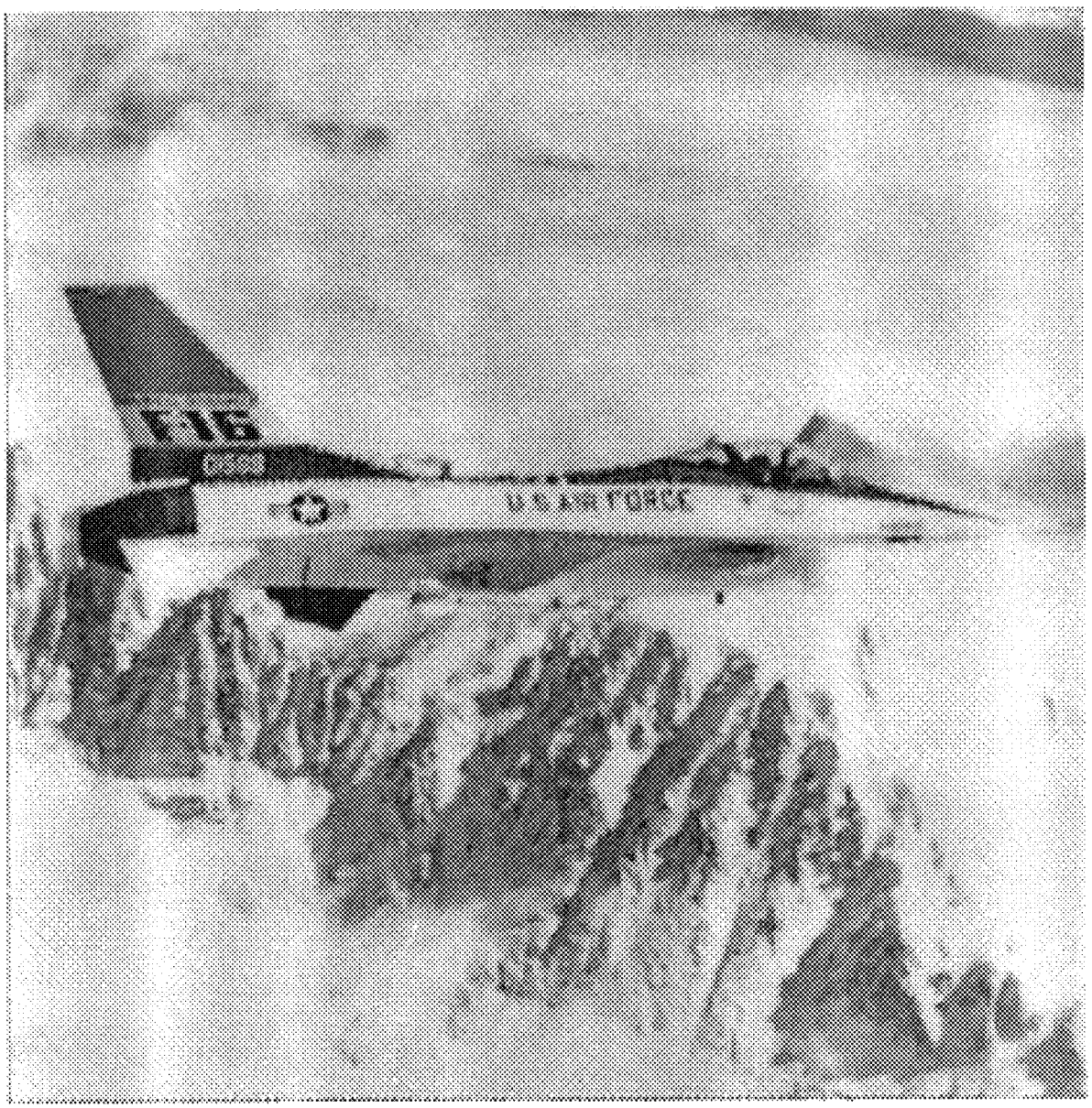

Basically, the vector encoding procedure is an image compression method with distortion because the original image file 16 can not be completely converted back by using the conversion file 36. Each image square 32 of the original image file 16 is usually not identical with its most similar image square 34 contained in the camouflaging image file 18. When converting the index numbers of the conversion file 36 back to the original image of the original image file 16 by using the image squares 34 of the camouflaging image file 18, the converted image will not be exactly the same as the original image contained in the original image file 16. However, the distortion is usually very minor to human eyes. FIGS. 9 and 12 show such an example. FIG. 9 shows an original image and FIG. 12 shows a converted image of the original image in FIG. 9.

Figures 4, 5:
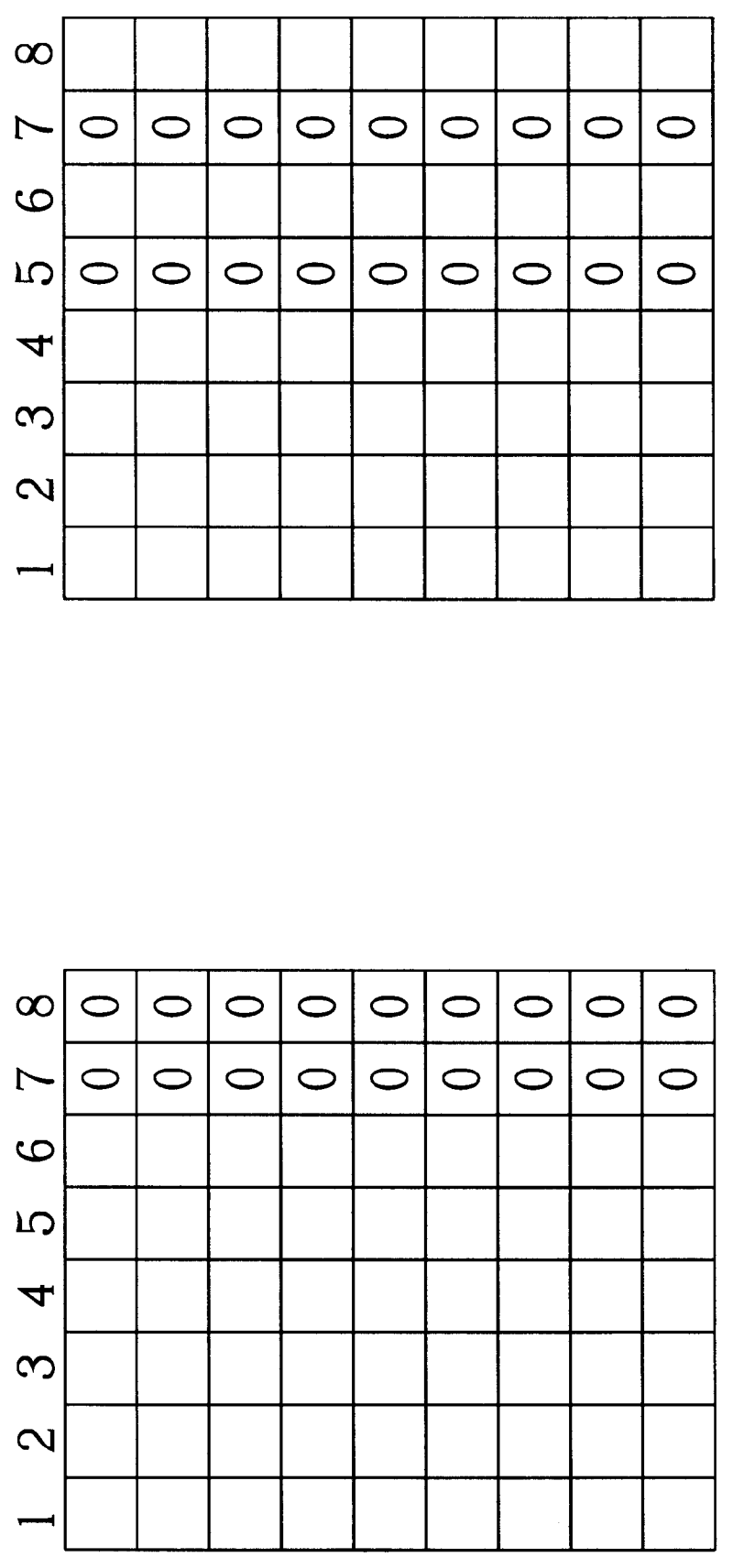
Figures 6, 7:
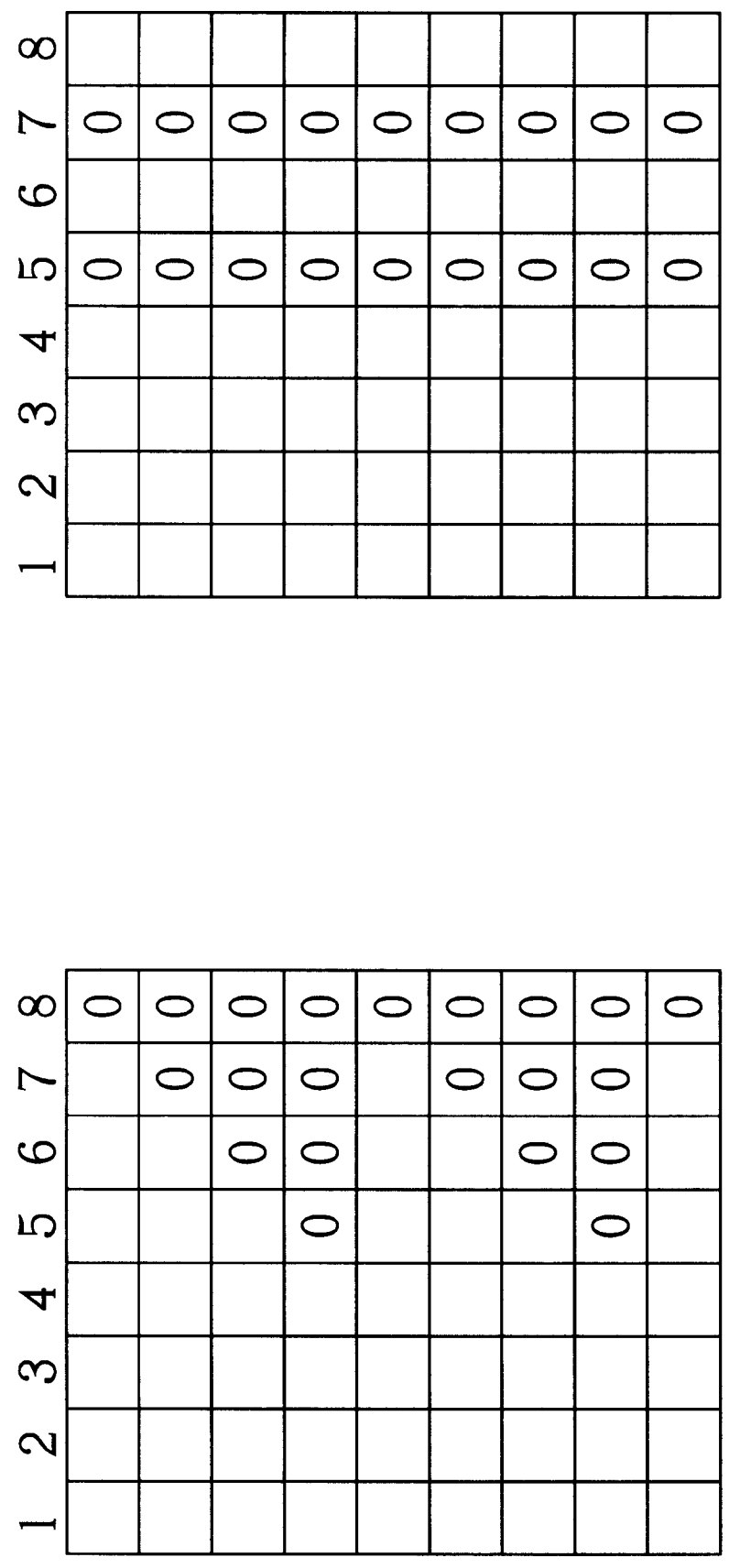

Please refer to FIGS. 4 to 7. These figures show various methods for merging the index numbers recorded in the conversion file 36 into the camouflaging image file 18 to generate the encrypted image file 19. If the conversion file 36 is transmitted with the camouflaging file 18, it may draw an illegal intruder's attention. But if the index numbers of the conversion file 36 is merged into each pixel's lower bits of the camouflaging image file 18, it is almost impossible for an intruder to tell that the conversion file 36 is hidden in the camouflaging file 18. There are many ways to merge the index numbers in the conversion file 36 into the lower bits of the camouflaging image file 18. FIG. 4 to FIG. 6 show three different methods which replace some of the lower bits with the index numbers. In FIG. 4, the data bits of the index numbers, symbolized by 0, are stored in the two low order bits, $7^{th}$ and $8^{th}$ bits, of each pixel. In FIG. 5, the data bits of the index numbers are stored in another two low order bits, $5^{th}$ and $7^{th}$ bits, of each pixel. In FIG. 6, the data bits of the index numbers are stored from the $5^{th}$ bit to the $8^{th}$ bit of each pixel and the number of bits stored in each pixel varies from one to four. In FIG. 7, the data bits of the index numbers are inserted after the $5^{th}$ and $7^{th}$ bits of each pixel to form a new pixel with 10 bits.

FIGS. 4 to 7 show two types of merging methods for storing the index numbers into the low order bits of the camouflaging image file 18 to generate the encrypted image file 19. FIGS. 4 to 6 belong to a first type over which some low order bits of the camouflaging image file 18 stored in the encrypted image file 19 are replaced by the index numbers. FIG. 7 belongs to a second type over which the original content of the camouflaging image file 18 stored in the encrypted image file 19 is not changed by the index numbers stored in it. Each of the two types of merging methods has its own benefits and drawbacks. The size of the encrypted image file 19 generated by using the first type merging methods is the same as the camouflaging image file 18, but the index numbers will destroy some of the low order bits of the camouflaging image file 18 stored in the encrypted image file 19. On the contrary, the encrypted image file 19 generated by the second type merging methods will keep the content of the camouflaging file 18 intact, but the size of the encrypted image file 19 will be larger than the original camouflaging file 18 and thus will take longer time to transmit it.

Figure 10:
Figure 11:

Please refer to FIGS. 9–12. FIGS. 9–12 show various images used or generated by the image cryptosystem 10 in each stage according to the present invention. FIG. 9 shows an original image stored in the original image file 16. FIG. 10 shows an original camouflaging image stored in the camouflaging image file 18. FIG. 11 shows an encrypted image generated by using the merging method shown in FIG. 4. And FIG. 12 shows a restored image generated by using the index numbers and the camouflaging image shown in FIG. 11. As shown in these figures, the restored image shown in FIG. 12 is not severely distorted when compared with the original image shown in FIG. 9. And it is quite difficult to tell that an image such as the one shown in FIG. 12 is hidden in the encrypted image shown in FIG. 11.

The above mentioned encrypting method can further be modified to improve its security. For example, the index numbers stored in the conversion file 36 can be compressed and also rearranged before merged into the camouflaging image file 18. And the index numbers can be randomly assigned to each of the image squares 34 so that it will be difficult for an intruder to restore the original image by using the camouflaging image stored in the encrypted image file 19.

Figure 8:
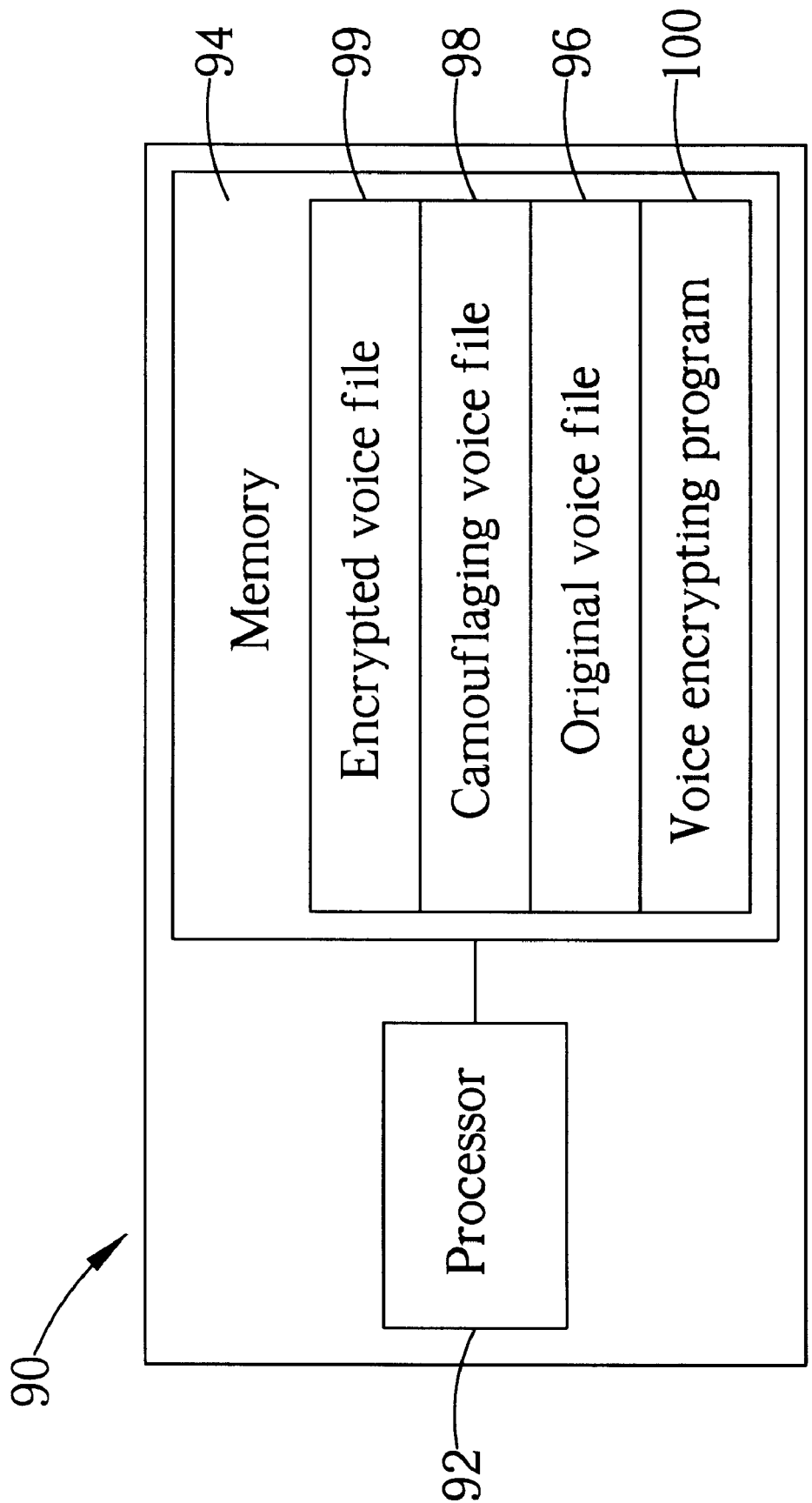
FIG. 8 is a function block diagram of a voice cryptosystem according to the present invention.

Please refer to FIG. 8. FIG. 8 is a function block diagram of a voice cryptosystem 90 according to the present invention. The cryptosystem 90 comprises a memory 94 for storing data and programs, and a processor 92 for executing the programs stored in the memory 94. The memory 94 comprises an original voice file 96, a camouflaging voice file 98, an encrypted voice file 99, and a voice encrypting program 100 stored in the memory 94.

The voice stored in a voice file such as the files 96, 98 and 99 comprises a plurality of sequentially arranged voice elements. Each voice element can be represented as a byte indicating its volume. The number of bits contained in one voice element represents its resolution. For example, a voice element with eight bits may have 256 volume level variations. The left most bit of each voice element is the highest order bit and the right most bit is the lowest order bit. A high order bit has more influence than a low order bit over the volume of each voice element. Variations over the low order bits usually have very minor impact over the voice contained in a voice file and usually can not be detected by human ears. If some data bits to be transmitted through the Internet is stored in the low order bits of a voice file in a predetermined manner, it is very difficult for a person to identify the variations over the low order bits of the voice file by ears. This is the reason why the camouflaging voice file 98 is called a camouflaging file because it is used to hide the index numbers converted from the original voice file 96 in its low order bits to form the encrypted voice file 99.

The voice encrypting program 100 will use the camouflaging voice file 98 to convert the original voice file 96 into a plurality of index numbers according to the vector encoding procedure shown in FIG. 3. In the encrypting process, the voice encrypting program 100 will divide each of the original voice file 96 and the camouflaging voice file 98 into a plurality of equal-sized voice blocks, assign an index number to each voice block of the camouflaging voice file 98, compare each voice block of the original voice file 96 with every voice block of the camouflaging voice file 98 according to a predetermined comparing method to find a most similar voice block and record the index number of the most similar voice block, and merge the recorded index numbers of the original voice file 96 with lower order bits of each voice elements of the camouflaging voice file 98 according to one of the methods shown in FIGS. 4 to 7 to generate the encrypted voice file 99.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A cryptosystem for encrypting an original file by using a camouflaging file, each of the original and camouflaging files comprising a plurality of basic units arranged according to a predetermined sequence, each basic unit comprising a predetermined number of digital bits arranged from high order to low order, the cryptosystem comprising:

a memory for storing the original and camouflaging files and programs;

a processor for executing the programs stored in the memory; and an encrypting program stored in the memory for encrypting the original file by using the camouflaging file;

wherein the encrypting program will divide all the basic units of each of the original and camouflaging files into a plurality of equal-sized data blocks, assign an index number to each data block of the camouflaging file, compare each data block of the original file with the data blocks of the camouflaging file according to a predetermined comparing method to find a most similar data block, record the index number of the most similar data block for each data block of the original file in the memory, and merge all the recorded index numbers of the original file with lower order bits of the basic units of the camouflaging file according to a predetermined merging method to generate an encrypted file for the original file.

2. The cryptosystem of claim 1 wherein the original file and the camouflaging file are both digital image files over which the original image file contains an original image in it and the camouflaging image file contains an camouflaging image in it, and each basic unit of the original or camouflaging image file represents a digitized pixel (picture element) of the original or camouflaging image, and wherein a first bit of each pixel has more influence than a second bit of the pixel over the gray level or color of the pixel if the order of the first bit is higher than the second bit.

3. The cryptosystem of claim 2 wherein each data block of the original or camouflaging image file represents an image square of the original or camouflaging image.

4. The cryptosystem of claim 3 wherein the recorded index numbers of the original image file is arranged in a predetermined sequence before merging into the camouflaging image file.

5. The cryptosystem of claim 3 wherein the image encrypting program uses the recorded index numbers of the original image file to replace designated low order bits of the camouflaging image file when merging the recorded index numbers into the camouflaging image file.

6. The cryptosystem of claim 3 wherein the image encrypting program inserts the recorded index numbers of the original image file around designated low order bits of the camouflaging image file when merging the recorded index numbers into the camouflaging image file so that a predetermined number of bits is added to every pixel of the camouflaging image file.

7. The cryptosystem of claim 1 wherein the original file and the camouflaging file are both digital voice files over which the original voice file contains an original voice in it and the camouflaging image file contains an camouflaging voice in it, and each basic unit of the original or camouflaging image files represents a digitized voice element of the original or camouflaging voice, and wherein a first bit of each voice element has more influence than a second bit of the voice element over the volume of the voice element if the order of the first bit is higher than the second bit.

8. The cryptosystem of claim 7 wherein each data block of the original or camouflaging voice file represents a voice block of the original or camouflaging image.

9. The cryptosystem of claim 8 wherein the recorded index numbers of the original voice file is arranged in a predetermined sequence before merging into the camouflaging voice file.

10. The cryptosystem of claim 8 wherein the image encrypting program uses the recorded index numbers of the original voice file to replace designated low order bits of the camouflaging voice file when merging the recorded index numbers into the camouflaging voice file.

11. The cryptosystem of claim 8 wherein the image encrypting program inserts the recorded index numbers of the original voice file around designated low order bits of the camouflaging voice file when merging the recorded index numbers into the camouflaging voice file so that a predetermined number of bits is added to every pixel of the camouflaging image file.

\* \* \* \* \*